United States Patent
Farkaly (10) Patent No.: US 7,926,274 B2
(45) Date of Patent: Apr. 19, 2011

(54) RANKINE ENGINE WITH EFFICIENT HEAT EXCHANGE SYSTEM

(75) Inventor: Stephen J. Farkaly, Indianapolis, IN (US)

(73) Assignee: FSTP Patent Holding Co., LLC, Madison, WI (US)

(*) Notice: Subject to any disclaimer, the term of this patent is extended or adjusted under 35 U.S.C. 154(b) by 421 days.

(21) Appl. No.: 12/149,670

(22) Filed: May 6, 2008

(65) Prior Publication Data

US 2009/0217666 A1 Sep. 3, 2009

Related U.S. Application Data

(60) Provisional application No. 60/929,012, filed on Jun. 8, 2007.

(51) Int. Cl.
*F01K 23/06* (2006.01)
*B60K 3/00* (2006.01)
*H05B 6/64* (2006.01)
*H05B 6/80* (2006.01)
*F28D 15/00* (2006.01)

(52) U.S. Cl. .......... 60/670; 180/302; 180/304; 219/682; 219/687; 165/104.11

(58) Field of Classification Search .......... 60/614–624, 60/645, 670, 659, 641.8, 641.11, 641.15, 60/655; 165/10, 104.11–104.34; 180/302–304; 219/678–688, 690–724, 736–763
See application file for complete search history.

(56) References Cited

U.S. PATENT DOCUMENTS

| | | | | |
|---|---|---|---|---|
| 3,732,692 A | * | 5/1973 | Norell | 60/661 |
| 3,778,578 A | * | 12/1973 | Long et al. | 219/687 |
| 3,794,801 A | * | 2/1974 | Long et al. | 180/304 |
| 3,816,689 A | * | 6/1974 | Long | 219/687 |
| 3,891,817 A | | 6/1975 | Brown | |
| 4,064,852 A | | 12/1977 | Fulenwider, Jr. | |
| 4,089,176 A | * | 5/1978 | Ashe | 60/650 |
| 4,240,259 A | * | 12/1980 | Vincent | 60/670 |
| 4,310,738 A | | 1/1982 | Moretti et al. | |
| 4,590,766 A | * | 5/1986 | Striebich | 60/618 |
| 4,697,424 A | * | 10/1987 | Dickerson et al. | 60/670 |
| 4,956,534 A | | 9/1990 | Martin | |
| 5,277,285 A | * | 1/1994 | Musachio | 191/6 |
| 5,286,939 A | | 2/1994 | Martin | |

(Continued)

FOREIGN PATENT DOCUMENTS

CA 2078708 3/1994

(Continued)

*Primary Examiner* — Thomas E Denion
*Assistant Examiner* — Christopher Jetton
(74) *Attorney, Agent, or Firm* — Richard C. Litman (57) ABSTRACT

The Rankine engine with efficient heat exchange system provides a rapidly rechargeable thermal energy storage bank operably connected to a heat engine capable of propelling a vehicle. Microwave energy is supplied to the system via a network of waveguides. Thermal storage bank has a slurry in a heat exchanger capable of sustaining operation of the engine without requiring the microwave source. The slurry provides a mixture of powdered stainless steel and silicone oils functioning as the working fluid in the hot side of the heat exchanger. The slurry may be heated by plugging the system into standard AC power for a predetermined microwave heat charging duration. A closed, triple-expansion, reciprocating Rankine cycle engine capable of operating under computer control via a high pressure micro-atomized steam working medium is provided to propel the vehicle. A variety of working fluids are capable of powering the Rankine cycle engine.

17 Claims, 5 Drawing Sheets

U.S. PATENT DOCUMENTS

| | | | |
|---|---|---|---|
| 5,385,214 A * | 1/1995 | Spurgeon | 180/304 |
| 5,512,734 A | 4/1996 | Copstead | |
| 6,064,047 A | 5/2000 | Izzo | |
| 6,993,898 B2 | 2/2006 | Parkin | |
| 2004/0099261 A1 * | 5/2004 | Litwin | 126/638 |
| 2004/0139723 A1 | 7/2004 | Parkin | |
| 2005/0139594 A1 | 6/2005 | Jones et al. | |
| 2006/0049184 A1 | 3/2006 | Garboski | |
| 2006/0107585 A1 | 5/2006 | Gupta | |

FOREIGN PATENT DOCUMENTS

| | | |
|---|---|---|
| CN | 1731035 A | 2/2006 |
| DE | 41 28 103 A 1 | 2/1993 |
| DE | 19701094 A 1 | 7/1998 |
| DE | 10337105 A1 | 3/2005 |
| GB | 1 416 055 | 12/1975 |
| GB | 2 052 027 A | 1/1981 |
| JP | 7-316830 | 12/1995 |
| WO | WO 0027992 | 5/2000 |

* cited by examiner

RANKINE ENGINE WITH EFFICIENT HEAT EXCHANGE SYSTEM

CROSS-REFERENCE TO RELATED APPLICATION

This application claims the benefit of U.S. Provisional Patent Application Ser. No. 60/929,012, filed Jun. 8, 2007.

BACKGROUND OF THE INVENTION

1. Field of the Invention

The present invention relates to heat exchangers, and particularly to a Rankine engine with an efficient heat exchange system that may be used, e.g. to power a vehicle without expending non-renewable fuel (i.e., traditional fossil, alcohol, hydrogen, soy or agriculturally based, etc), to power the engine.

2. Description of the Related Art

Chemical energy in the form of batteries has been used since the dawn of automotive history for storage of electrical energy required to operate the automobile. Modern hybrid automobiles use the rechargeable energy storage system (RESS) with a small diesel or gas engine to turn electrical generating equipment and battery banks. However, batteries are not an optimal energy storage solution due to their poor charge time to discharge ratios and their toxicity upon disposal.

Microwave radiation has proven to be efficient at heating powdered metals in the sintering process, since powdered metal offers minimum reflectivity. Certain stainless steel alloys exhibit tremendous heat capacity, nearly that of water. Powdered metal in an oil, another semi-viscous media, to produce a slurry may provide a substantial improvement over current thermal energy storage technology because microwave energy is capable of heating the permeable powdered metal/silicone oil or similarly engineered heat retentive slurry in minutes, instead of the, hours and significant expense of battery recharging.

The ability to charge the working fluid of a heat exchanger in minutes instead of hours charging and maintaining/exchanging/replacing batteries may be highly appreciated as current technology hybrid vehicle accrue mileage and extended usage in the real world environment.

Recharging locations may become as universal as current refueling stations. Thermal energy storage is an ideal scenario from an energy usage standpoint, and a direction that is currently and technologically practical to explore.

Thus, a Rankine engine with efficient heat exchange system solving the aforementioned problems is desired.

SUMMARY OF THE INVENTION

The Rankine engine with efficient heat exchange system has a rapidly rechargeable thermal energy storage bank operably connected to a heat engine capable of propelling a vehicle. Microwave energy is supplied to the system via a network of waveguides.

The thermal storage bank comprises a slurry in a heat exchanger capable of sustaining operation of the engine without requiring constant powering of the microwave source. The slurry provides a mixture of a compressed powdered metal/ceramic matrix and silicone oils/heat retentive viscous media functioning as the working fluid in the hot side of the heat exchanger. The slurry may be heated (thermally enabled) by plugging the system into standard AC power for a predetermined microwave charging duration.

A closed, highly insulated, triple-expansion, reciprocating Rankine cycle engine capable of operating under the computer control via a high pressure micro-atomized steam working medium is provided to propel the vehicle. A variety of working fluids are capable of powering the Rankine cycle engine.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
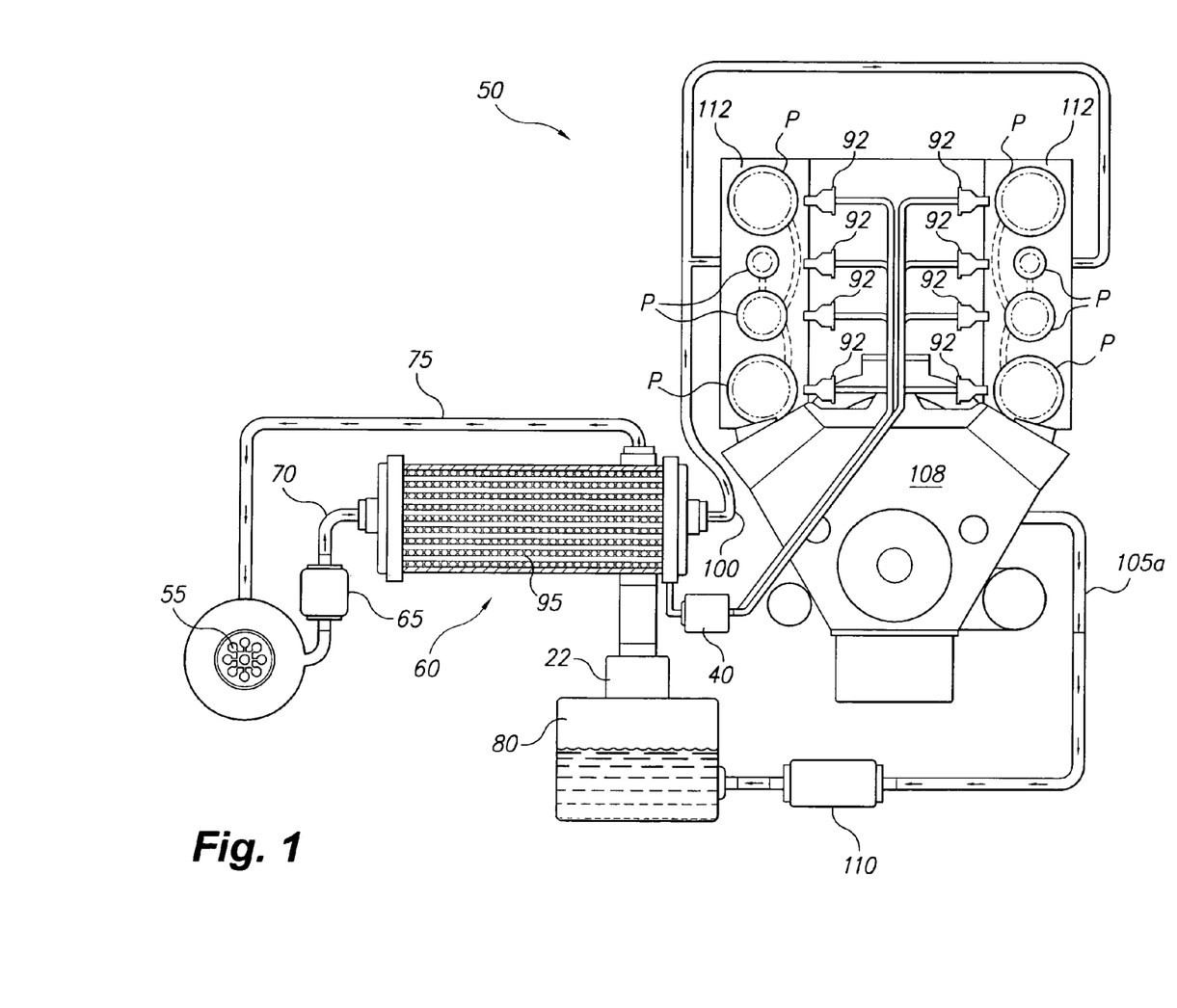
FIG. 1 is a diagram of a Rankine engine with efficient heat exchange system according to the present invention.
Figure 2A:
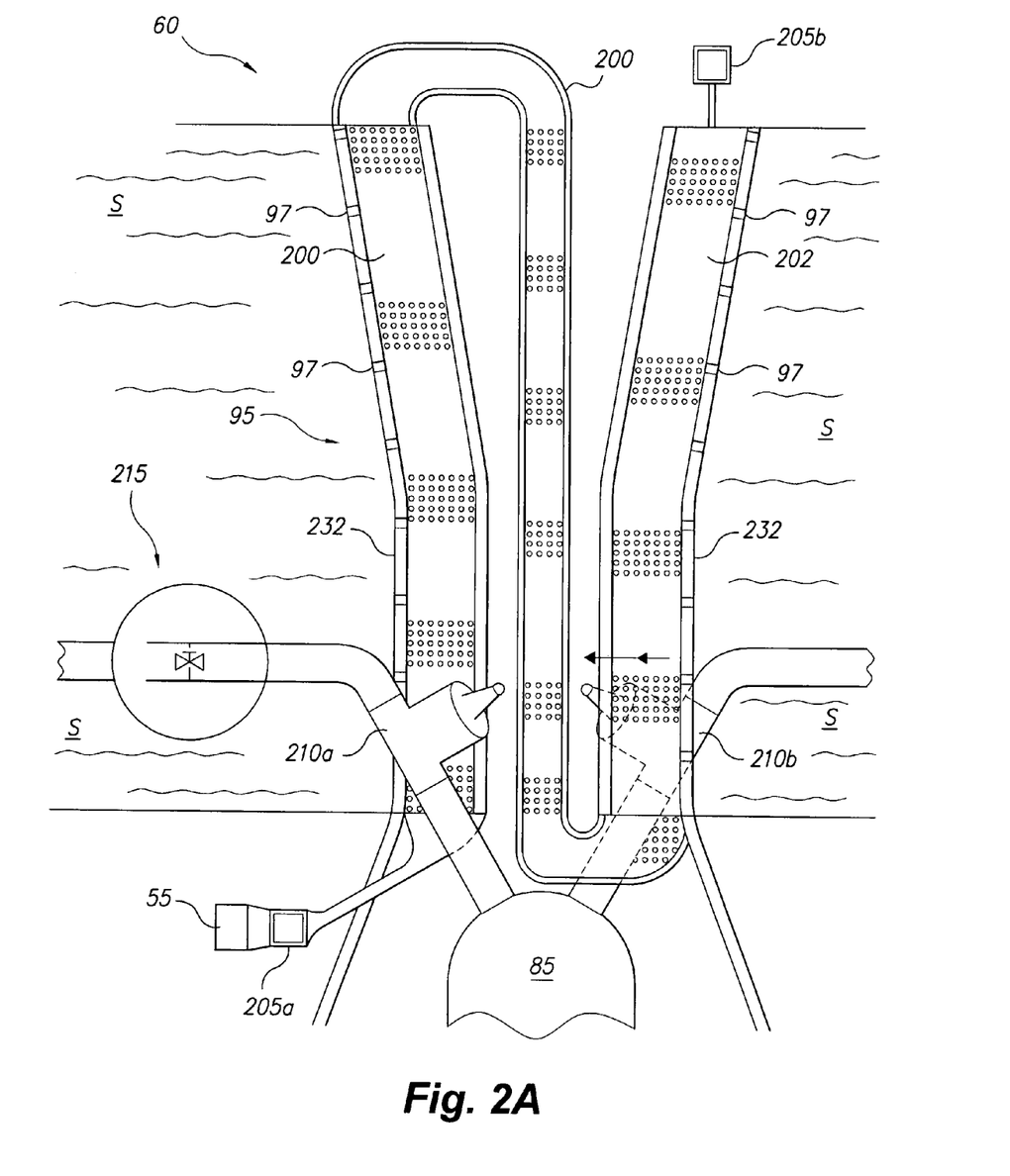
FIG. 2A is a partial diagrammatic sectional view of heat exchanger internal components of the Rankine engine with efficient heat exchange system according to the present invention, showing general layout of components and internal geometric configuration of the assembly.
Figure 2B:
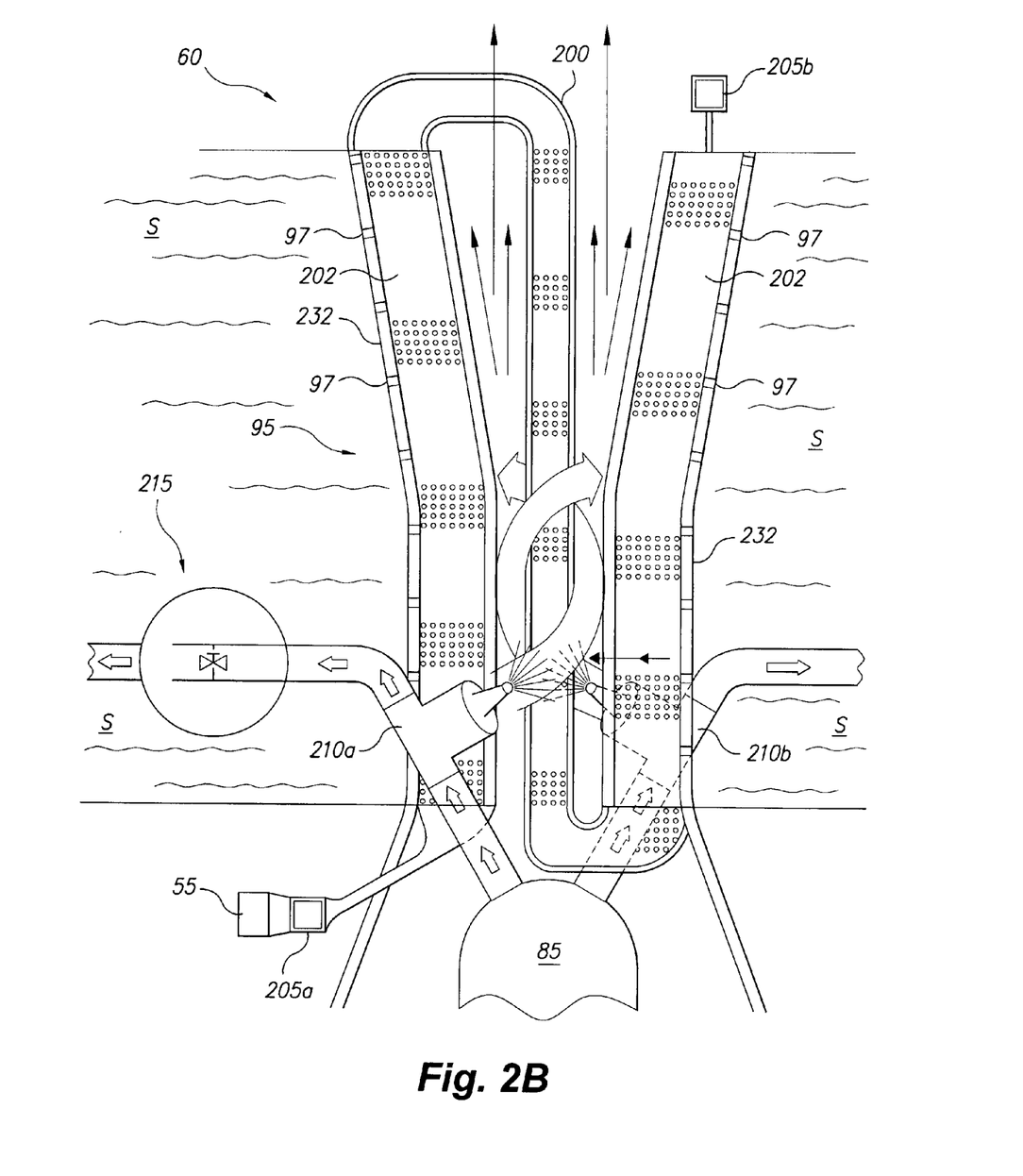
FIG. 2B is a partial diagrammatic sectional view of heat exchanger components of the Rankine engine with efficient heat exchange system according to the present invention exchanging heat and producing working gas during operation of the engine.

As shown if FIGS. 1, 2A and 2B, the present invention relates to a Rankine engine with efficient heat exchange system having a quickly rechargeable thermal energy bank with a slurry S circulating through an energy storage heat exchanger 60, wherein the slurry S can be rapidly heated by electromagnetic energy in the form of microwave heating. The microwave energy may be supplied to the system via a network of waveguide/heat exchange gasifier tubes 200 and waveguide interconnections 205*a* and 205*b*.

The microwave source may include, but is not limited to, at least one magnetron tube 55 that can be coupled to the waveguide network at waveguide interconnection 205*a*. The magnetron 55 can be charged by time/distance of operation desired, i.e., a commuter trip may be estimated for travel time or calculated by GPS for distance. Under computer control, a high pressure fed-finely atomized working fluid dispersed tangentially into a favorable low pressure environment created and enhanced through velocity/pressure trade-off enabling geometry heat exchanging gasifier tubes ensuring a minimum amount of stored thermal energy be drawn from the system under normal operation regime to achieve the trip with safety reserve. Since the magnetron(s) 55 may be a part of the onboard system 50, thermal recharging stations could be located conveniently at place of employment or popular destinations, enroute smart-rail recharging, as well as regenerative braking in a feedback loop. The ability of the magnetron 55 to deliver the energy quickly precludes time and energy consuming recharging periods.

The thermal energy storage of a slurry S in heat exchanger 60 can sustain operation of a Rankine cycle engine 108 to operate a vehicle for extended periods of time without a constant or direct connection to an electrical power grid, while retaining the potential to be quickly and conveniently recharged enroute if necessary.

The slurry S is an engineered slurry comprising, for example, highly refined micro-powdered stainless steel and finely powdered ceramic materials in a viscous or semi-viscous mixture combined with silicone-based oils or in combination with other suitable materials of high heat capacity such as clays or salts which may repeatedly absorb, retain, and disperse the waveguide supplied microwave energy. Heat retentive viscous fluid, of high heat capacity, such as a silicone based oils, or aforementioned engineered slurry is capable of functioning as the thermal energy supply fluid in the hot side of the heat exchanger 60. Some degree of viscosity is preferred in the engineered slurry S so that the slurry S can be slowly pumped through or directly heated by the permeable matrix containing the waveguide connections in order to bring it up to (and maintain for extended periods) the maximum possible storage of heat energy (without significant outgassing). The viscous nature of the slurry is ideal for maximum heat transfer to the working fluid, while limiting deleterious oxidation events to the primary matrix. Liquid ceramics, liquefied metals, clays, or salts may be used in place of silicone oils as the optimum engineered thermal energy retention fluid. The stored thermal energy produces the last percentage of conversion of the pre-heated engine working fluid (preheated by first circulating, via preheat line 105b, proximate the slurry in heat exchanger 60) to the working gas as produced in the changing cross-section tubes 95 of heat exchanger 60. The cross-sectional geometric change is intended to facilitate the vapor phase transformation through localized reduction of withdrawn thermal energy requirements from the thermal reservoir.

Insulation is provided in order to maintain the slurry S at sufficient temperature to effect the conversion, and can comprise a plurality of layers of zirconium applied by plasma-spray process, over which several inches of ceramic-based insulation could be applied. Vacuum chambers, other thermal barriers, etc., may be introduced into the layers of insulation in order to reduce radiated heat from the entire device to a negligible level.

Preferably the heat exchanger 60, including gasifier tubes 95, is constructed primarily of an austenitic nickel-base superalloy, such as Inconel®, or other typically high temperature-resistant material, high-nickel content, superhigh performance alloy, such as Hastelloy® or the like, capable of withstanding the long duration elevated temperatures of the slurry S. The heat exchanger operates to draw thermal energy from the heated slurry S, which may either thermosiphoned or, alternatively, may be mechanically pumped across a plurality of shaped diffuser tubes 95. The advantage of the powdered metal, or permeable powdered metal/ceramic matrix coincident to the slurry S is the ability to be heated almost instantly to extreme temperatures by the supplied microwave energy. Powdered materials absorb microwave energy readily, as they display huge cumulative surface area and low coefficients of reflectivity. The engineering of a strategically positioned permanently permeable matrix composed of a mixture of compressed powdered materials, both ceramic and metal based, provide sufficient waveguide conductivity to repeatedly heat within a near percentage of solidification/coalescence, while retaining capability of efficient heat transfer to slowly circulating heat retentive slurry.

The quantity of slurry S in the base of the heat exchanger 60 is sufficient to ensure adequate thermal energy transfer in order to operate the engine 108, which is capable of operating via a high pressure micro-atomized steam working medium.

The slurry S may be heated by plugging the system into standard AC power for a predetermined heat-charging duration, or, alternatively, by utilizing an enroute rail charging system while the vehicle is on the road.

Figure 3:
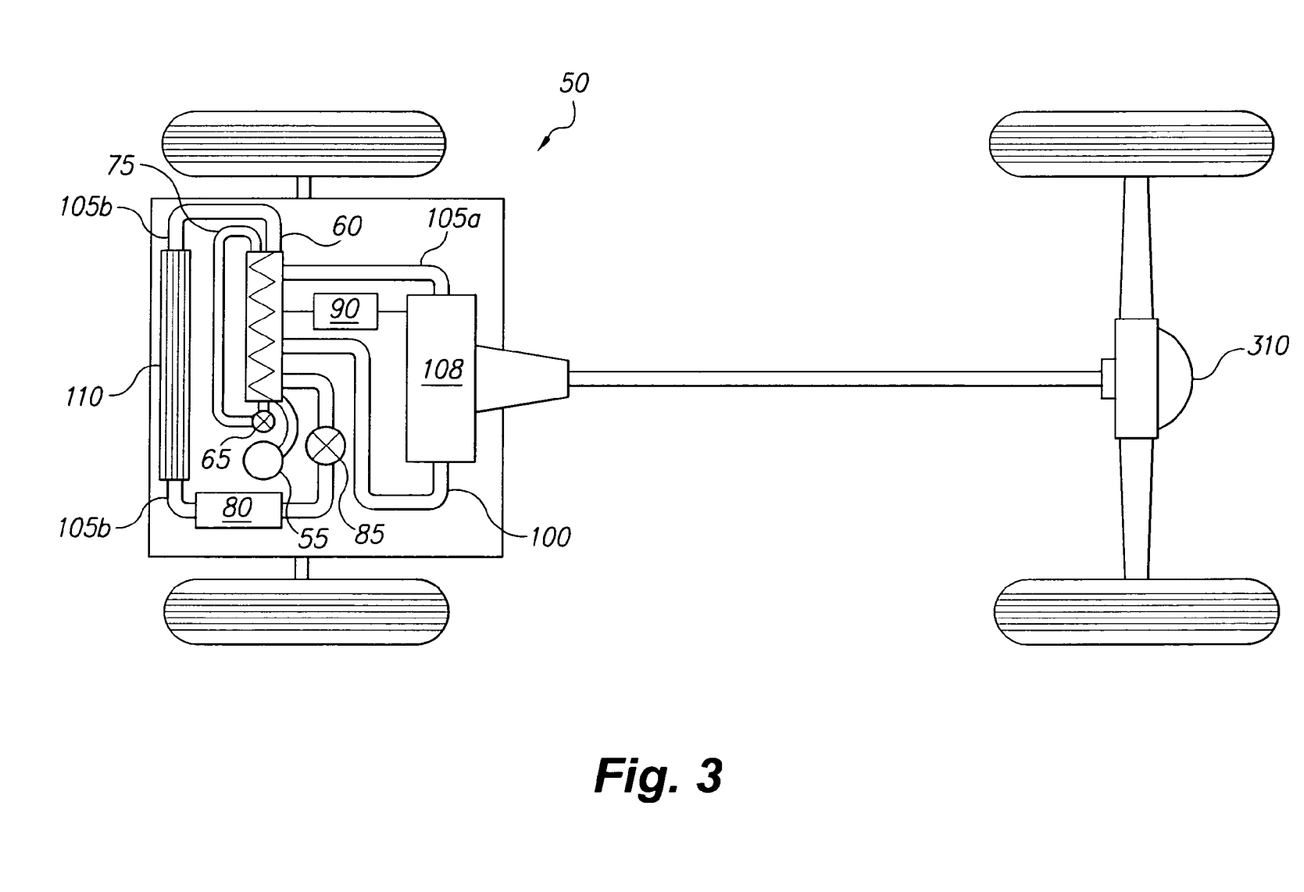
FIG. 3 is a diagrammatic top view of an automobile equipped with a Rankine engine with efficient heat exchange system according to the present invention.

As shown in FIG. 3, the Rankine engine with efficient heat exchange system comprises on-board microwave generator 55 (OBMWG) connected to the heat exchanger via waveguide interconnection 205a. High temperature slurry pump 65 slowly pumps the slurry S via slurry supply line 70 through "hot" side of heat exchanger 60. The slurry S recirculates back to the slurry pump 65 via slurry return line 75. In actual practice, the slurry reservoir and the heat exchanger can be most efficiently constructed and thermally insulated as a single integral unit. As shown in FIGS. 2A-2B, the waveguide interconnection 205A in the heat exchanger 60 joins an enclosed, circular, heat transfer/waveguide continuation tube 200 that is disposed concentrically within the internally hourglass shaped gasifier tube 95. Tube 200 acts as a central conductor of thermal energy, an axis about which the finely atomized working fluid is dispersed. Atomized working fluid is thusly exposed to the maximum possible area of heat exchanger wall surface area to promote efficient heat transfer.

There may be plurality of such gasifier tubes 95 disposed adjacent to each other within the heat exchanger 60. The gasifier tube 95 is configured so that the engine-driving work fluid is kept isolated from the slurry S. The working fluid powering engine 108 may be a variety of formulation, including, but not limited to, pure water, a recapturable refrigerant, such as ammonia or Puron and the like.

Disposed inside the central heat absorption/transfer tube 200 is a continuation of the waveguide charged permeable powdered metal and ceramic matrix member 202. As shown in the section drawing of FIG. 2A, the central conductor of the heat rejection tube 200 interconnects the two wall-adjacent portions of the tube 200 in the section drawing. In actual practice, the matrix 202 extends about the entire circumference of the changing cross-section gasifier tube. Preferably, member 202 is capable of high electromagnetic energy absorption, while encountering minimum reflection from the waveguide charged by magnetron 55. Members 202 may also remain capable of repeated extreme thermal cycling without significant degradation of material properties, such as permanent permeability, in order to act as an efficient conduit for thermal energy introduced into the entire slurry S.

Microwave energy conducted through the absorption tube 200, effects a conversion of EM energy into thermal energy, rapidly heating anything in contact with, or inside, the tube 200. The tube 95 has a plurality of perforations or slotted opening 97 through its outer walls 232. The slotted openings 97 allow slurry S circulating thought the heat exchanger 60 to enter, remain, and gradually flow within the central heat absorption/transfer tube 200. Since the slurry S has a directional flow (imparted by slurry pump 65) from the integral slurry reservoir through the heat exchanger gasifier tube section 60 to the opposite end of the heat exchanger 60, slurry S circulates throughout tube 200 and will flow directionally through absorption tube 200 until it can escape back to the common reservoir of heated slurry through the slotted openings 97 on the opposite side. This slow directional flow of high heat capacity slurry in constant contact with the walls of the gasifier enables the maximum amount of thermal energy dispersal into the regime of the highly atomized working fluid. Slurry S that flows through the heat absorption tube 200 in this manner may be initially heated and then remain heated for extended periods to temperatures between 1100 C to 1300 C (the maximum temperature remaining below sintering threshold, whereupon the slurry charging matrix may coalesce into a solid, losing some degree of it's desired permeability, E-M energy absorption capability, and further, the ability to transfer heat to the slurry). Inconel 718 or higher temperature capable grade superalloy is the preferred material for gasifier tube 95 construction, as it maintains sufficient structural integrity to house the powdered metal and ceramic matrix at or near sintering temperatures, while repeatedly performing it's role as a structured enclosure of geometry as a gasifier.

Microwave radiation has proven to be highly efficient at heating powdered metals. Thus, the powdered metal suspended in silicone oils offers the ability to flow through a heat exchanger and transfer heat energy to the diffuser tube, while minimizing outgassing, and can be maintained in a vacuum to improve retention of thermal energy, while limiting oxidation. It is contemplated that the slurry S can retain these temperatures for a considerable duration once the microwave energy is removed from the waveguide.

Referring again to FIG. 3, working fluid originates in reservoir 80, which is connected to the working fluid supply high pressure pump 85, which, in turn, has an output connected to the heat exchanger 60. As shown in FIG. 2B, high pressure pump 85 has a manifolded output, which connects to a pair of atomizer nozzles 210a and 210b disposed tangentially within opposing sidewalls 232 of each one of the gasifier tubes 95. The pump connection places atomizer nozzles 210a and 210b (and all succeeding nozzles plumbed in a plurality of gasifier tubes) in a commonly manifolded arrangement connecting to a pressure regulator 215 having return line 216, and back to reservoir 80. The output line of atomizer 210b in FIG. 2A can be connected to a manifold capable of feeding the high pressure working fluid to remaining. pairs of atomizers 210a and 210b in remaining gasifier tubes 95, which comprise the working fluid portion of the heat exchanger 60.

As shown in FIGS. 2A-2B, the atomizers 210a and 210b are disposed in a region of sidewalls 232 above the lower conic section of the gasifier tube 95. The atomizers 210a and 210b may, alternatively, be disposed in the conic portion of the gasifier tube 95 at or below the geometric transition of the gasifier tube 95, the location depending primarily on region of pressure gradient advantage. Moreover, the nozzle orientations of atomizers 210a and 210b are preferable non-coplanar with respect to each other. The non-coplanar orientation of the atomizers 210a and 210b may be provided to facilitate a spiraling action of working fluid finely atomized spray/steam around central coincident conductor tube 200, to maximize the time in contact with the highest temperature regime of the gasifier tube.

During motor (non-charging) operations of the device 50, the combination of the high thermal energy of slowly circulating slurry S in gasifier tube 200 and pressure differential created by Bernoulli tube 95 acting upon the spray mist of working fluid ejected from the atomizers 210a and 210b creates a rapid phase change of the working, fluid from liquid phase to a steam/vapor phase. The steam/working gas can be manifolded from the gasifier tubes 95 by a computer controlled ingress/egress output manifold that takes working gas from the dome of the heat exchanger and feeds a high pressure steam output line 100. In this way, the working gas can be momentarily stored during periods of deceleration or braking of the vehicle, and a recirculation valve may be employed to reheat or superheat unused or underutilized output working gas. The high pressure steam in output line 100 is ultimately fed to the engine 108. While the engine 108 can be a variety of designs, including but not limited to, a turbine engine or the like, preferably, the engine 108, as shown in FIG. 1, has a closed, triple-expansion, reciprocating configuration utilizing a Rankine cycle to do work based on adiabatic expansion of the working medium in the engine 108.

The system in engine 108 may be open if water is used as the working fluid, or completely closed (sealed) if a suitable convertible fluid is used that can be recaptured indefinitely (Freon/Puron). As shown in FIG. 1, the engine 108 is a V-8 configuration, having opposing cylinder head 112 and opposing cylinder bores disposed therein (and within the cylinder block of engine 108). Designated as C1, C2, and C3. Cylinders C1 have a low volume, high pressure bore, Cylinders C2 have a medium volume, medium pressure bore, and Cylinders C3 have a high volume, low pressure bore. Thus, the configuration offers increasing bore and/or stroke in opposed pairs. The high pressure steam output line 100 connects to the first set of bores C1. The C1 (high pressure) bores may incorporate additional waveguide-fed matrix and slurry locations integral to their chamber heads in order to effect/promote and sustain superheat status of certain eligible working fluid(s) in closest mechanical proximity to the expansion phase.

As shown in FIG. 1, the C1 bores have insulated steam outlet ports connecting to the C2 bores, and the C2 bores have steam outlet ports connecting to the C3 bores. Under electromechanical and/or computer control (e.g., computer and electronically controlled square-wave pulse-activated high degree-of-atomization nozzles, in combination with mechanically controlled cam-action poppet valves), when pistons P in the C1 bores have completed a power stroke, intermediate pressure steam is permitted to escape via steam outlet to drive pistons P in the C2 bores. Subsequently, when the pistons P in the C2 bores have completed their power stroke, lower pressure steam is permitted to escape via steam outlet to drive pistons P in the C3 bores, and when pistons P in the C3 bores have finished their power stroke, the low pressure work medium is exhausted to return line 105a. Basic aspects of the triple expansion engine 108 have long been understood by those of ordinary skill in the art.

As is known by one of ordinary skill in the art, the reciprocating motion of the pistons P is transmitted to a crankshaft, which ultimately powers differential 310 for rotational motion of the vehicle wheels. The precisely controlled timing of steam power through reciprocating engine 108 is accomplished by a set of electrical solenoid or variable timing camshaft actuated poppet valves 92 connected to computer 40 via control lines 91. Common, split, or multiple camshafts can control the entire poppet valve inlet and egress system, which may incorporate methods of variable timing of poppet valve events to achieve localized performance enhancements, such as may be offered by these variations.

As shown in FIG. 3, the return line 105a is routed back to the heat exchanger 60 where the medium can be preheated for another cycle of flow through the heat exchanger 60. The preheated working medium is then routed via line 105b to condenser 110. Output of condenser 110 is routed via continuation of line 105b back to the reservoir 80. The control computer 40 has a control connection to the heat exchanger 60 in order to precisely control atomization flow (typically square wave pulse width) provided to the atomizers 210a and 210b, as well as to perform other functions related to functions of the heat exchanger 60.

The atomizers 210a and 210b are controlled by computer 40 so that only the minimum necessary amount of working gas is produced based on real-time evaluation of current need (throttle position versus load calculation). Producing the gas near-instantaneously on a need-only basis allows for significantly reduced consumption of the thermal energy stored in the slurry. Computer 40 can accept inputs from a variety of sensors disposed in the system in order to make the executive command decisions required to achieve the objective of the on-demand vapor/steam supply.

Preferably, computer 40 is a digital convertible fluid injection (DCVI), and is capable of accurately addressing the pulse width of the liquid atomization nozzles 210a and 210b in the heat exchanger 60, as well as the pulse width of the solenoid operated poppet valves 92 in the inlet of engine 108. For example, computer 90 can take a reading of the exhaust gas pressure and temperature, and loop it back to the gas-producing nozzle pulse width. Hence, the device is both load and demand (acceleration or deceleration) sensitive to real time.

Sensors could be added to read inlet (liquid) feed temperature and pressure (from feed pump), working gas temperature and pressure in the plenum/dome, load encountered, condition desired (accelerate/decelerate/stop/reverse), mean effective pressure in any of the cylinders (high/medium/low pressure) to vary the timing of poppet valve events through such mechanism as described (mechanical systems: multiple cam/articulating rocker arm stanchions/lobe advance or retard mechanism. Digitally controlled electrical systems may include solenoid-activated poppet valves). Precise event timing control (DCVI computerized nozzles, as well as poppet valve events) is desirable as the slurry S gradually and continuously loses temperature to the working fluid as the working fluid transitions to working gas. The longest range is available when only the precise and minimum amount of gas is produced to meet the load and condition requirements.

Figure 4:
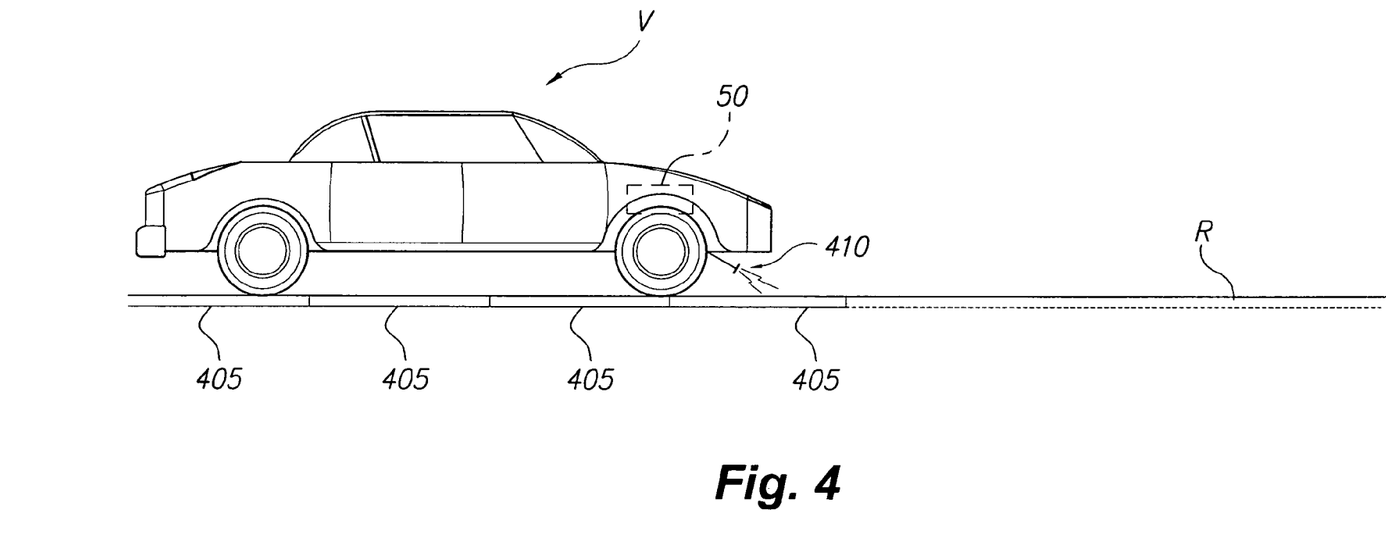
FIG. 4 is a diagrammatic view of an enroute charging system for a Rankine engine with efficient heat exchange system according to the present invention.

As shown in FIG. 4, in the case of enroute recharging, a buried smart rail conductor 405 that is basically flush with a road surface R may be utilized, either by direct contact (brush/roller) or by inductive coupling, to provide the electrical energy necessary to operate the microwave generator 55 or charge a supercapacitor to fire the magnetron 55 when desired board the vehicle V. The rail is segmented by insulation and can powered by any existing power grid from which (preferably) rectified DC current can be obtained. Each segment can be fed by a solid state, e.g., transistor or SCR circuit, whereby the high current only flows to the particular segment when the associated gating circuit is energized.

The gate of each semiconductor can be actuated by an inductively coupled or otherwise induced discrete signal from the vehicle V directly above it, thereby allowing the smart rail 405 to remain safe from lethal contact with accidentally contact by humans, animals, or the like. Segments 405 may be of a length only sufficient for a conducting condition while the vehicle V needing the recharge is directly above it, thereby shielding the rail 405 from accidental contact. As such, rail segments 405 conduct only in response to an induced signal from above, which can come from several sources, such as a coil 410 inducting the trigger (gating) current, or an ultrasound device, or a laser signal, or any other device that can perform the task of momentarily (locally) charging the gate of a main power transistor or SCR, which connects the high current power grid to the segmented rail 405, forcing it to conduct. Once the vehicle V has passed beyond a particular energized one of the segments 405, the smart rail 405 returns to a nonconducting and thoroughly (safe) condition.

The smart rail 405 may be accessed to charge the on-board microwave generator OBMWG 55 directly, or to charge a supercapacitor that can store the charge and supply it to the OBMWG 55 whenever desired or necessary.

The signal that suggests the smart rail conductor 405 may eventually be capable of discrete operation, whereby the information of which distinct vehicle V is drawing power from the rail can be recorded and used for energy billing purposes. The smart rail system 405 allows a commuter the ability to access the smart rail 405 if in need of a recharge (and have the energy transfer recorded), or pass over it with no energy transfer. The smart rail 405 may be an ideal enroute recharging mechanism for a variety of vehicles utilizing some form of electrical or chemical energy as a means of propulsion, and may be incorporated into existing highways while remaining unobtrusive, safe, and non-interfering with the operation of existing technology vehicles.

It is to be understood that the present invention is not limited to the embodiment described above, but encompasses any and all embodiments within the scope of the following claims.

I claim:

1. A Rankine engine with efficient heat exchange system, comprising:
    a vapor phase change engine connected to vehicle propulsion means;
    an energy storage heat exchanger;
    an energy source proximate the heat exchanger, wherein the energy source includes a waveguide network connected to the energy source;
    a high operating temperature slurry capable of rapid heating under electromagnetic energy exposure and being capable of retaining the high temperature for a substantial duration, whereby the waveguide network guides energy from the energy source to the slurry;
    means for circulating the slurry in a closed loop within the heat exchanger;
    a working fluid;
    means for circulating the working fluid through the heat exchanger to pick up sufficient heat content from the slurry in order to change phase to a high pressure vapor/steam; and
    means for directing the high pressure vapor/steam to an inlet of the engine in order to operate the engine;
    whereby a vehicle can be propelled under vapor/steam power from stored heat energy in the slurry until the slurry temperature cools down to a temperature ineffective to cause the work fluid to vaporize.

2. A Rankine engine with efficient heat exchange system, comprising:
    a vapor phase change engine connected to a vehicle transmission,
    an energy storage heat exchanger operably connected to the vapor phase change engine, the heat exchanger including a permeable powdered metal/ceramic matrix disposed within the heat exchanger;
    an energy source proximate the heat exchanger, wherein the energy source includes a waveguide network connected to the energy source;
    a high operating temperature slurry capable of rapid heating under electromagnetic energy exposure and being capable of retaining the high temperature for a substantial duration, whereby the waveguide network guides energy from the energy source to the slurry and the matrix is coincident to the slurry, the matrix accelerating the heating of the slurry when the energy is applied;
    a slurry pump circulating the slurry in a closed loop within the heat exchanger;
    a working fluid;
    a working fluid pump circulating the working fluid through the heat exchanger to pick up sufficient heat content from the slurry in order to change phase to a high pressure vapor/steam; and
    a high pressure steam output line directing the high pressure vapor/steam to an inlet of the engine in order to operate the engine;

whereby the vehicle can be propelled under vapor/steam power from stored heat energy in the slurry until the slurry temperature cools down to a temperature ineffective to cause the work fluid to vaporize.

3. The Rankine engine according to claim 2, wherein the electromagnetic energy exposure comprises:

a microwave energy source proximate the heat exchanger.

4. The Rankine engine according to claim 2, further comprising:

manifolded high pressure output lines extending from the working fluid pump; and a plurality of gasifier tubes proximate the heat exchanger, the gasifier tubes receiving high pressure fluid from the manifolded high pressure output lines, the gasifier tubes outputting a rapid phase change of the working fluid from liquid to the high pressure vapor steam/vapor.

5. The Rankine engine according to claim 4, further comprising:

output manifolds disposed on the gasifier tubes; and a computer operably connected to the gasifier output manifolds, the computer modulating the high pressure vapor steam/vapor to the engine inlet.

6. The Rankine engine according to claim 4, further comprising atomizers disposed within the gasifies, the atomizers atomizing high pressure fluid at the inputs to the gasiffiers.

7. The Rankine engine according to claim 6, further comprising a plurality of waveguide continuation tubes disposed within the gasifier tubes, the continuation tubes centrally conducting thermal energy about an axis through which atomized working fluid is dispersed by the atomizers, wherein atomized working fluid is exposed to the maximum possible area of heat exchanger wall surface area to promote efficient heat transfer to the working fluid.

8. The Rankine engine according to claim 4, wherein the gasifier tubes are disposed in a housing of the heat exchanger.

9. The Rankine engine according to claim 4, wherein the gasifier tubes are made from a high grade, high temperature capable superalloy, the gasifier tubes maintaining structural integrity at sintering temperatures.

10. The Rankine engine according to claim 7, wherein a first atomizer within a gasifier tube is disposed in a non coplanar manner with respect to a second atomizer disposed in the same gasifier tube, the non-coplanar atomizers facilitating a spiraling action of working fluid finely atomized spray/steam around the central coincident conductor tube, thereby maximizing the time in contact with a highest temperature regime of the gasifier tube.

11. The Rankine engine according to claim 2, wherein the engine has a closed, triple-expansion, reciprocating configuration utilizing the Rankine cycle to do work based on adiabatic expansion of the working medium in the engine.

12. The Rankine engine according to claim 2, further comprising an engine control computer, the engine control computer controlling a set of inlet and outlet valves of the engine, thereby precisely controlling timing of steam power through the engine.

13. The Rankine engine according to claim 12, further comprising a control line forming an interconnection between the engine control computer and the atomizers, the engine control computer controlling the atomizers via the interconnection, wherein only the minimum necessary amount of working gas is produced based on real-time evaluation of current throttle position versus a load calculation computed by the engine control computer.

14. The Rankine engine according to claim 3, further comprising means for capturing electrical energy generated remotely from the vehicle, said energy capturing means powering the microwave energy source while the vehicle is on the road.

15. The Rankine engine according to claim 1, wherein the electromagnetic energy source is microwave.

16. The Rankine engine according to claim 1, further comprising a permeable powdered metal/ceramic matrix disposed within the heat exchanger and coincident to the slurry, the matrix accelerating the heating of the slurry when the electromagnetic energy is applied.

17. The Rankine engine according to claim 2, wherein the electromagnetic energy source is microwave.

\* \* \* \* \*